F. A. DORSCH.
SEALED TOP CONTAINER.
APPLICATION FILED MAR. 3, 1919.
1,359,970.
Patented Nov. 23, 1920.
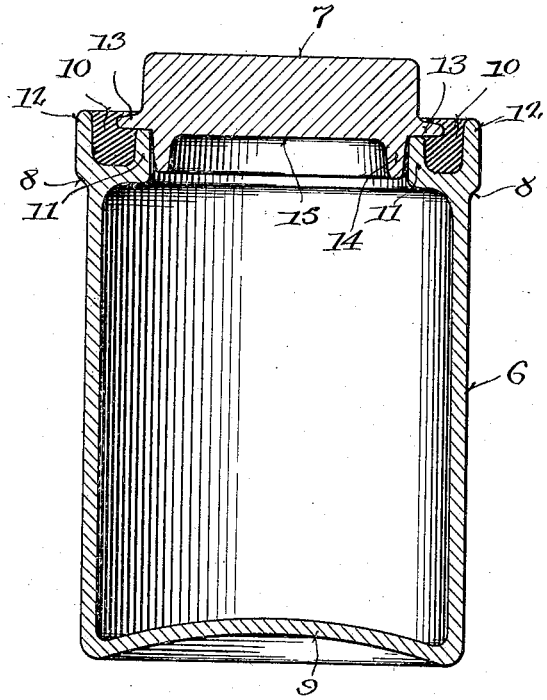
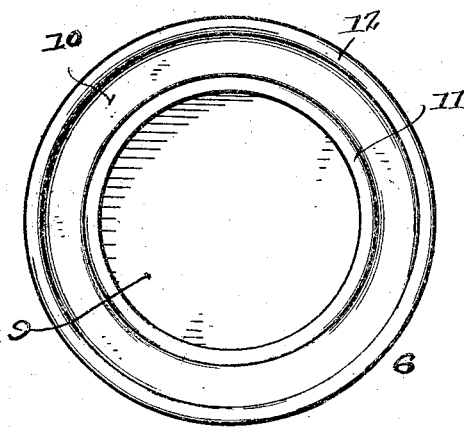
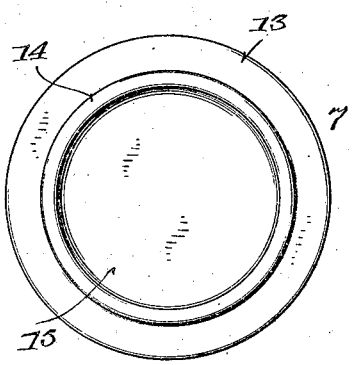
Inventor
Frank A. Dorsch.
By Morsell & Keeney
Attorneys.

UNITED STATES PATENT OFFICE.

FRANK A. DORSCH, OF WAUWATOSA, WISCONSIN.

SEALED-TOP CONTAINER.

1,359,970.   Specification of Letters Patent.   Patented Nov. 23, 1920.

Application filed March 3, 1919. Serial No. 280,454.

*To all whom it may concern:*

Be it known that I, FRANK A. DORSCH, a citizen of the United States, and resident of Wauwatosa, in the county of Milwaukee and State of Wisconsin, have invented new and useful Improvements in Sealed-Top Containers, of which the following is a description, reference being had to the accompanying drawings, which are a part of this specification.

This invention relates to improvements in sealed top containers more particularly, although not solely, adapted for use in connection with preserved fruit, jelly, vegetables, etc.

The "Mason" form of fruit jar commonly in use has many objectionable features. After the fruit has been poured into a "Mason" jar, it is sealed by putting a rubber washer over the neck and then screwing the threaded cover on the open end. It is often found that the rubber washer is a trifle loose, or that the cover can not be screwed on tightly. When it is thus positioned, air will enter the jar and spoil the contents. Other times the contents may leak and get into the grooves of the threaded cover, thereby cementing the ribs and grooves together, making it very difficult for the cover to be removed. When a person tries to open the jar he will probably use a knife or other sharp instrument which is apt to slip and cut the operator. Or, the jar may be broken, thereby causing broken glass to get into the contents of the jar, or cutting the person attempting to open it.

Another form of fruit container commonly used is a plain open glass or jar in which the contents are sealed by pouring melted paraffin over the top of the contents. This, too, has its objections, as the paraffin is liable to mix with the contents of the jar.

It is one of the objects of the present invention to eliminate the foregoing objectionable features, and to provide an airtight fruit container of very simple construction which may be easily sealed or reopened.

A further object of the invention is to provide an air tight fruit container which will not permit the leakage of the contents.

A further object of the invention is to provide an air tight fruit container in which the melted paraffin used for sealing purposes will not enter the contents of the container.

With the above and other objects in view, the invention consists of the improved sealed top container and its parts and combinations as set forth in the claims and all equivalents thereof.

In the accompanying drawing in which the same reference characters indicate the same parts in all of the views:

Figure 1 is a vertical section of the sealed top and container;

Fig. 2 is a plan view of the container; and

Fig. 3 is an inverted plan view of the top.

Referring to the drawing, the numeral 6 indicates the container and numeral 7 the top.

The container 6 is preferably cylindrical in shape with a slight outward flare 8 at its upper portion. The bottom 9 of the cylindrical container is convex in cross section. The flared portion 8 is provided with a groove 10 throughout its circumference, the inner wall 11 of which is preferably lower than the outer wall 12.

The top member 7 is also preferably cylindrical in shape and has a circumferential flange 13 at its mid-portion. The lower portion 14 thus formed of the top member is of slightly less diameter than the inner diameter of the top portion of the container, thus allowing it to fit against the inner wall 11 of the container and form an annular space between the flange and its outer wall 12, while the circumferential flange 13 rests on the inner wall 11. The bottom face 15 of the top is hollowed out slightly.

When the jar is to be used, the preserves or fruit are poured into it and when the container is filled, the top is put on so that the flange 13 will rest on the inner wall 11 as was heretofore explained. Then, melted paraffin, or any other sealing medium is poured into the groove or recess 10 which seals the top and makes the container airtight. When the top is to be removed, a knife or other sharp instrument is inserted into the groove cutting the paraffin and thereby allowing the top to be easily removed.

From the foregoing description it will be seen that the sealed top container is of very simple construction and is well adapted for the purpose desired.

What I claim as my invention is:

1. A container, comprising a receptacle having a comparatively large groove at its upper open portion, the inner wall of said groove being lower than the outer wall, a cover member provided with an outwardly extending flange which rests on and projects outwardly beyond the inner wall of said receptacle groove but leaving a comparatively large space between its periphery and the outer wall of the container to permit the easy removal of the cover member, the upper surface of said flange being lower than the upper edge of the outer wall of the groove, and a sealing means within the groove and engaging the upper and the outer and the lower portions of the flange.

2. A container, comprising a receptacle having comparatively a large groove at its upper open portion, the inner wall of said groove being lower than the outer wall, a cover member provided with a lower portion which extends into the open end of the receptacle and also having an outwardly extending flange which rests on and projects outwardly beyond the inner wall of said receptacle groove, but leaving a comparatively large space between its periphery and the outer wall of the container to permit the easy removal of the cover member, the upper surface of said flange being lower than the upper edge of the outer wall of the groove, and a sealing means within the groove and engaging the upper and outer and lower portions of the flange.

In testimony whereof I affix my signature.

FRANK A. DORSCH.